United States Patent [19]

Iwama

[11] Patent Number: 5,241,612
[45] Date of Patent: Aug. 31, 1993

[54] MULTICORE OPTICAL CONNECTOR
[75] Inventor: Takeo Iwama, Kawasaki, Japan
[73] Assignee: Fujitsu Limited, Kanagawa, Japan
[21] Appl. No.: 944,906
[22] Filed: Sep. 15, 1992
[30] Foreign Application Priority Data Sep. 17, 1991 [JP] Japan .................. 3-236076

[51] Int. Cl.[5] .............................................. G02B 6/38
[52] U.S. Cl. ........................................ 385/74; 385/59; 385/71
[58] Field of Search ................... 385/74, 126, 59, 71, 385/60

[56] References Cited
U.S. PATENT DOCUMENTS

| | | | |
|---|---|---|---|
| 4,182,546 | 1/1980 | Lukas et al. ......................... | 385/59 |
| 4,277,185 | 7/1981 | Schrott et al. ..................... | 385/60 X |
| 5,123,073 | 6/1992 | Pimpinella ......................... | 385/59 |
| 5,133,032 | 7/1992 | Salter et al. ....................... | 385/59 X |

Primary Examiner—John D. Lee
Assistant Examiner—Phan T. Heartney
Attorney, Agent, or Firm—Armstrong, Westerman, Hattori, McLeland & Naughton

[57] ABSTRACT

A multicore optical connector comprising: a first connector part comprising a fiber array, a refractive index matching plate for preventing the diffusion of beams, and a lens array, in order mentioned thereabove, and a second connector part comprising a fiber array and a lens array, and wherein the diameter of each of the parallel beams that may be emitted outwardly from the lens array of the second connector part is relatively larger than that of the parallel beams that may be emmited outwardly from the lens array of the first connector part, and the first connector part and the second connector part are optically coupled such that both lens array are opposed to each other.

4 Claims, 3 Drawing Sheets

MULTICORE OPTICAL CONNECTOR

BACKGROUND OF THE INVENTION

1. Field of the Invention

The present invention relates to a multicore optical connector.

2. Description of the Related Art

To realize a miniaturization of associated equipment and a reduction of electrical power consumption thereof, a connector (not shown) made of molded resin or a connector (not shown) having silicon blocks with V-shaped grooves has been employed as a multicore optical connector in order to optically and mutually connect fiber arrays at once; each of the fiber arrays having a number of optical fibers located side by side in parallel formation.

In such multicore optical connectors, an axial deviation and an angular deviation between two fiber arrays are inevitable because of mechanical factors, such that the values of connection-loss or connection efficiency of each mutual optical fiber connection are widely dispersed in one multicore optical connector.

SUMMARY OF THE INVENTION

The primary object of the present invention is, therefore, to unify the connection-loss values or restrict same to a low level of irregularity thereof.

To achieve the above object, according to the present invention, there is provided a multicore optical connector comprising: a first connector part comprising a fiber array, a refractive index matching plate for preventing the diffusion of beams, and a lens array, in order mentioned thereabove, and a second connector part comprising a fiber array and a lens array, and wherein the diameter of each of the parallel beams that may be emitted outwardly from the lens array of the second connector part is relatively larger than that of parallel beams that may be emmited outwardly from the lens array of the first connector part, and the first connector part and the second connector part are optically coupled such that both lens array are opposed to each other.

With this arrangement, the irregularity of optical connection-loss values can be as small as possible, and accordingly, the practicability can be remarkably improved.

BRIEF DESCRIPTION OF THE DRAWINGS

These and other objects of the present invention will become apparent from the following detailed description of the preferred embodiment of the invention, taken in connection with the accompanying drawings.

In the drawings.

DESCRIPTION OF THE PREFERRED EMBODIMENTS

Referring to the accompanying drawings, a multicore optical connector 1 of an embodiment of the present invention is basically comprised of a first connector part 2 and a second connector part 3 opposed and connected thereto.

Figure 1:
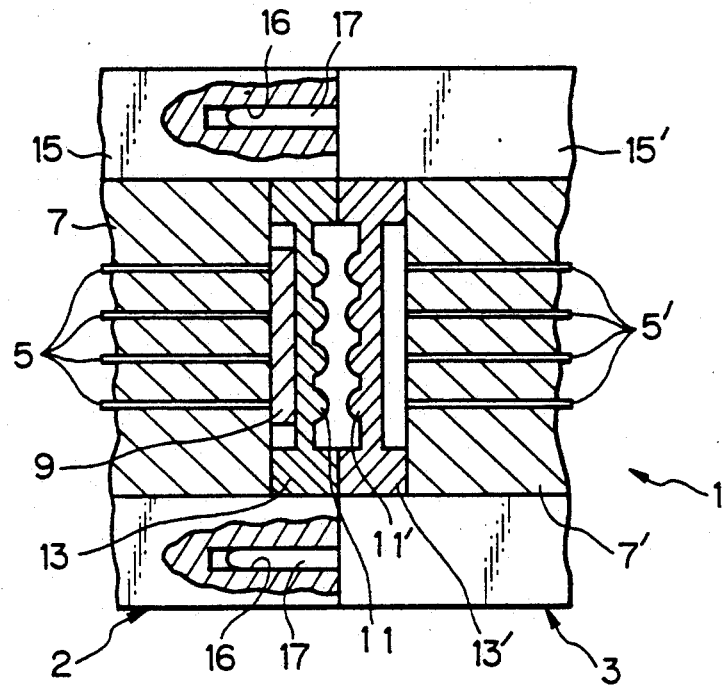
FIG. 1 is an enlarged fragmentary sectional plane view of a multicore optical connector according to an embodiment of the present invention, in a connected state.
Figure 2:
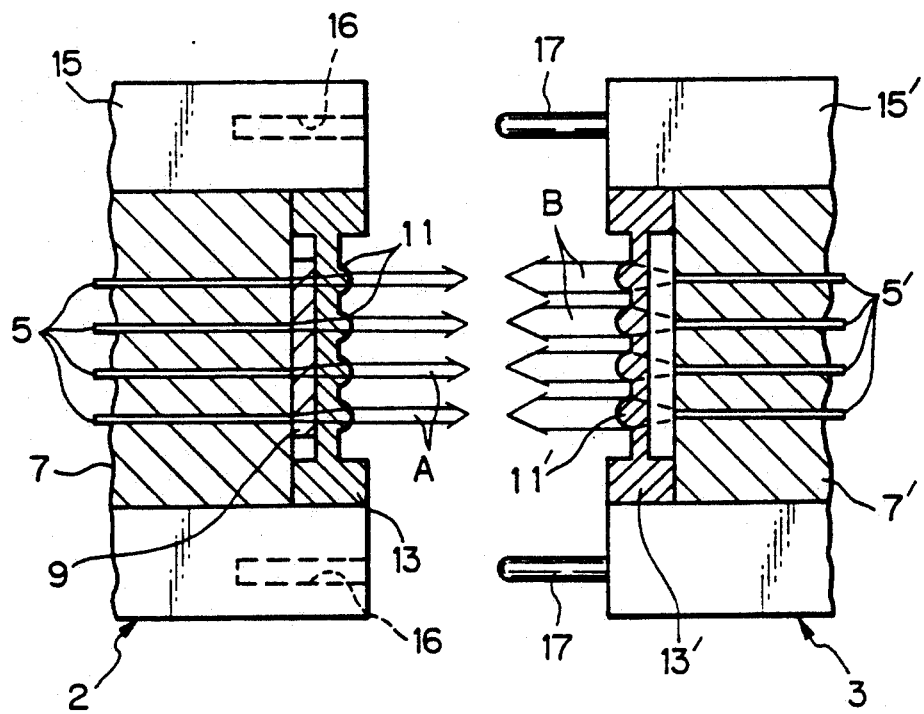
FIG. 2 is an enlarged fragmentary sectional plane view of the multicore optical connector, in a disconnected state.
Figure 3:
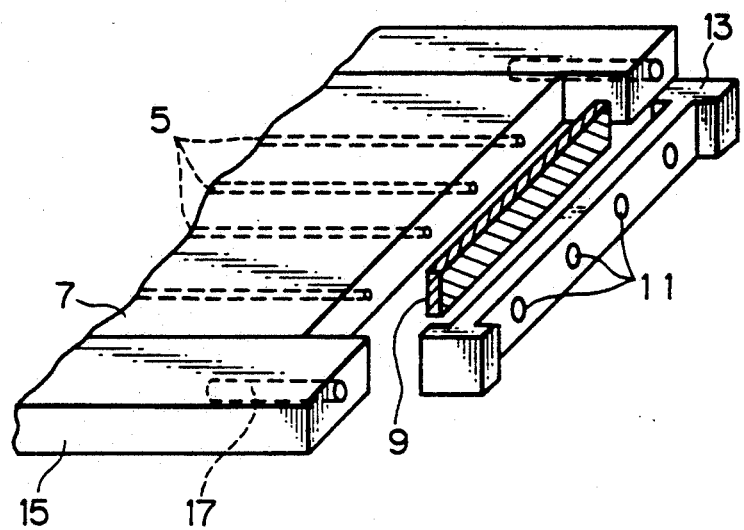
FIG. 3 is an exploded perspective view showing one part of the disconnected multicore optical connector.

The first connector part 2 includes a fiber array 7 in which a plurality of optical fibers 5 are embedded in parallel formation, a refractive index matching plate 9 made of, e.g., a desired glass plate for preventing a beam from being diffused and connected to an end face of the fiber array 7, a generally I-shaped lens array 13 that holds the refractive index matching plate 9 between the latter and the fiber array 7 and is provided with a plurality of lenses 11 spaced at a pitch corresponding to the optical fibers 5 of the fiber array 7 (FIG. 3), and a holder 15 for holding the fiber array 7 etc. and is provided with two holes 16 on the end face thereof.

In the first connector part 2 as constructed above, outgoing parallel beams A having a small diameter can be emitted from the lens array 13 due to the action of the beam diffusion preventing refractive index matching plate 9.

The second connector part 3 is comprised of a fiber array 7' in which optical fibers 5' are embedded, a lens array 13', similar to those of the first connector part 2 in shape and construction, and a holder 15' for holding the fiber array 7' etc. and is provided with two pins 17 that fit in the two holes 16 of the holder 15, respectively. Therefore, unlike the first connector part 2, in the second connector part 3 constructed above, outgoing parallel beams B having a large diameter can be emitted from the lens array 7', in view of the absence of the refractive index matching plate for preventing a beam from being diffused.

Figure 4:
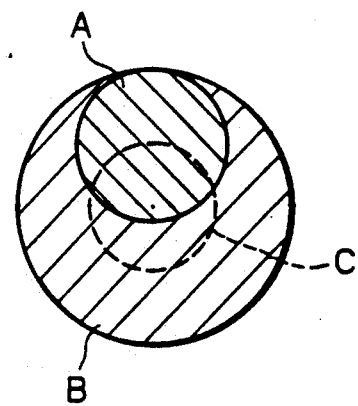
FIG. 4 is a view showing a tolerance of a relative displacement between two optical fibers to be optically coupled.
Figure 5:
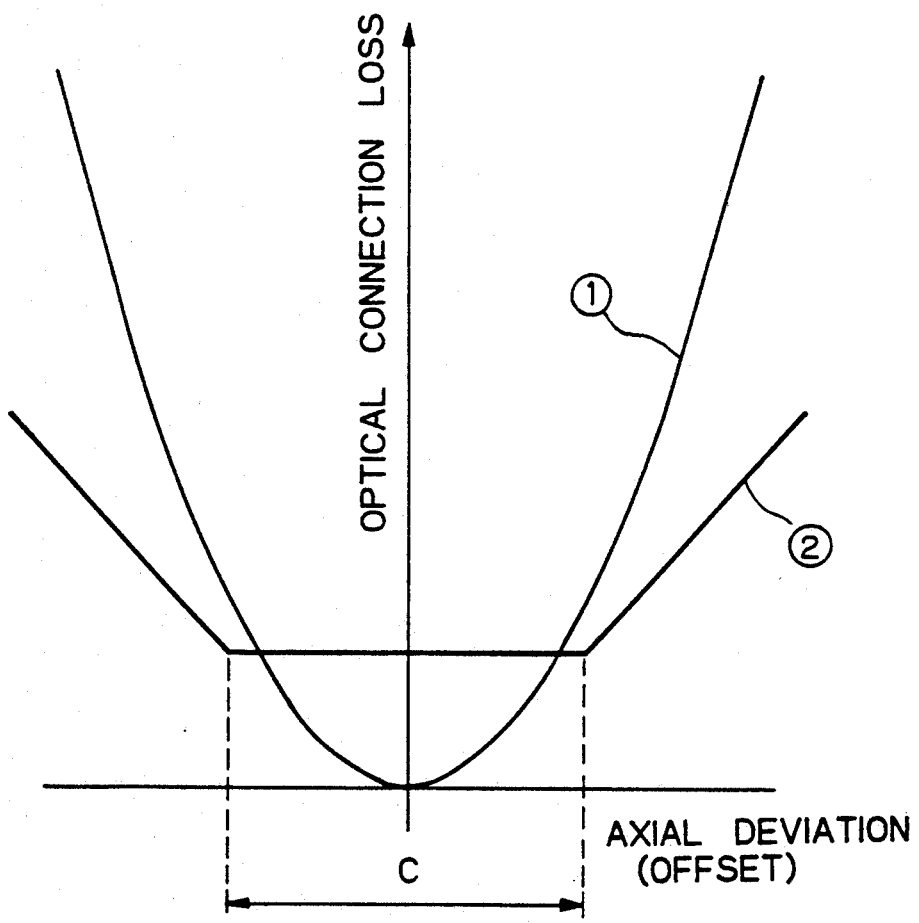
FIG. 5 is a diagrammatic view showing a relationship between the offset and the optical connection-loss.

In the multicore optical connector of this embodiment, comprising the first connector part 2 and the second connector part 3, wherein each of the beam diameters that may be emitted from the second connector part 3 is different to some extent from that of the beams that may be emitted from the first connector part 2, the tolerance of a deviation between both members 2, 3 in the plane perpendicular to the optical axis is substantially expanded, as shown in FIGS. 4 and 5.

In FIG. 5, the quadratic ① curve represents the relationship between the offset and the optical connection-loss in the case of beams with the same diameter that may be emitted from two lens (or two lens array) opposed and coupled to each other, wherein the optical connection-loss increases rapidly while the offset increases, thereby inducing an undesirably high irregularity in the optical connections of each two optical fibers within one multicore optical connector.

On the contrary, ② represents the same relationship in this embodiment, wherein, though there is something in optical connection-loss even if the offset is zero, the optical connection-loss is constant while the offset or axial deviation is in the range represented by C, thereby maintaining the irregularity of the optical connection-loss at a low level or near zero within one multicore optical connector.

Note that an aberration occurs if there is a difference in the Numerical Aperture of the outgoing beams, but the aberration can be sufficiently eliminated by providing an aspheric lens surface.

It is to be understood that the invention is by no means limited to the specific embodiment illustrated and described herein, and that various modifications thereof may be made which come within the scope of the present invention as defined in the appended claims.

I claim:

1. A multicore optical connector comprising:
a first connector part comprising a fiber array, a refractive index matching plate for preventing the diffusion of beams, and a lens array, in order mentioned thereabove, and
a second connector part comprising a fiber array and a lens array,
wherein a first diameter of each parallel beam emitted outwardly from the lens array of the second connector part is larger than a second diameter of each parallel beam emitted outwardly from the lens array of the first connector part, and
the first connector part and the second connector part being optically coupled such that both lens array are opposed to each other.

2. A multicore optical connector as defined in claim 1 wherein the refractive index matching plate is made of a certain glass plate.

3. A multicore optical connector as defined in claim 1 wherein the first connector part and the second connector part are provided with holders wherein the coupled face of said holders having at least one male-female connection.

4. A multicore optical connector as defined in claim 1, wherein at least one of the lens array of the first connector part and the lens array of the second connector part includes an aspherical lens.

* * * * *